(12) United States Patent
Johnston

(10) Patent No.: US 8,790,074 B2
(45) Date of Patent: Jul. 29, 2014

(54) MULTIPLEXED OPTICAL FIBER WEAR SENSOR

(75) Inventor: Robert T. Johnston, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 725 days.

(21) Appl. No.: 13/023,785

(22) Filed: Feb. 9, 2011

(65) Prior Publication Data

US 2012/0201656 A1    Aug. 9, 2012

(51) Int. Cl.
*F01B 25/26*    (2006.01)

(52) U.S. Cl.
USPC .......................................................... 415/118

(58) Field of Classification Search
USPC ............ 415/118; 73/7; 356/477, 72, 73, 73.1; 385/12, 13; 250/227.14
See application file for complete search history.

(56) References Cited

U.S. PATENT DOCUMENTS

| | | | |
|---|---|---|---|
| 4,884,434 A | 12/1989 | Satake et al. | |
| 5,440,395 A | 8/1995 | Makita | |
| 6,080,982 A * | 6/2000 | Cohen ....................... | 250/227.11 |
| 6,111,643 A | 8/2000 | Discenzo et al. | |
| 6,204,920 B1 * | 3/2001 | Ellerbrock et al. ........... | 356/477 |
| 6,785,004 B2 * | 8/2004 | Kersey et al. ................. | 356/478 |
| 6,868,711 B2 * | 3/2005 | Ebi ..................................... | 73/7 |
| 7,154,081 B1 * | 12/2006 | Friedersdorf et al. ... | 250/227.14 |
| 7,270,890 B2 | 9/2007 | Sabol et al. | |
| 7,551,268 B2 * | 6/2009 | Discenzo ......................... | 356/32 |
| 7,557,339 B2 * | 7/2009 | Poland et al. ............ | 250/227.14 |
| 7,582,359 B2 | 9/2009 | Sabol et al. | |
| 2002/0064330 A1 * | 5/2002 | Croteau et al. ................... | 385/12 |
| 2002/0064331 A1 * | 5/2002 | Davis et al. ...................... | 385/12 |
| 2003/0127232 A1 * | 7/2003 | Bussear et al. ................. | 166/373 |
| 2003/0202188 A1 * | 10/2003 | Discenzso ...................... | 356/477 |
| 2005/0287386 A1 | 12/2005 | Sabol et al. | |
| 2007/0258674 A1 * | 11/2007 | Wang et al. ...................... | 385/13 |

FOREIGN PATENT DOCUMENTS

| | | |
|---|---|---|
| EP | 1519181 A1 | 3/2005 |
| JP | 57151803 A | 9/1982 |
| JP | 2001021384 A | 1/2001 |
| WO | WO 2009063181 A1 * 5/2009 | ............ G01M 11/08 |

OTHER PUBLICATIONS

New PXI Express Module Measures FBG Optical Sensors; http://zone.ni.com/devzone/cda/pub/p/id/1158; National Instruments Corporation; Aug. 3, 2010; Instrumentation Newsletter.

* cited by examiner

*Primary Examiner* — Edward Look
*Assistant Examiner* — Aaron R Eastman

(57) ABSTRACT

An optical fiber wear detector that includes one or more FBG sensors positioned within the fiber that are operable to reflect a defined wavelength of an optical input beam. The wear detector includes a light source for generating the optical input beam that propagates down the optical fiber and interacts with the FBG sensor. The wavelength of the optical beam that is reflected by the FBG sensor is detected, where loss of the reflected signal indicates that the fiber before the FBG sensor or the FBG sensor itself is damaged, which would most likely be an indication of wear on the component. The depth of wear can be determined by providing multiple FBG sensors in a single optical fiber and/or providing multiple optical fibers with one or more FBG sensors.

19 Claims, 4 Drawing Sheets

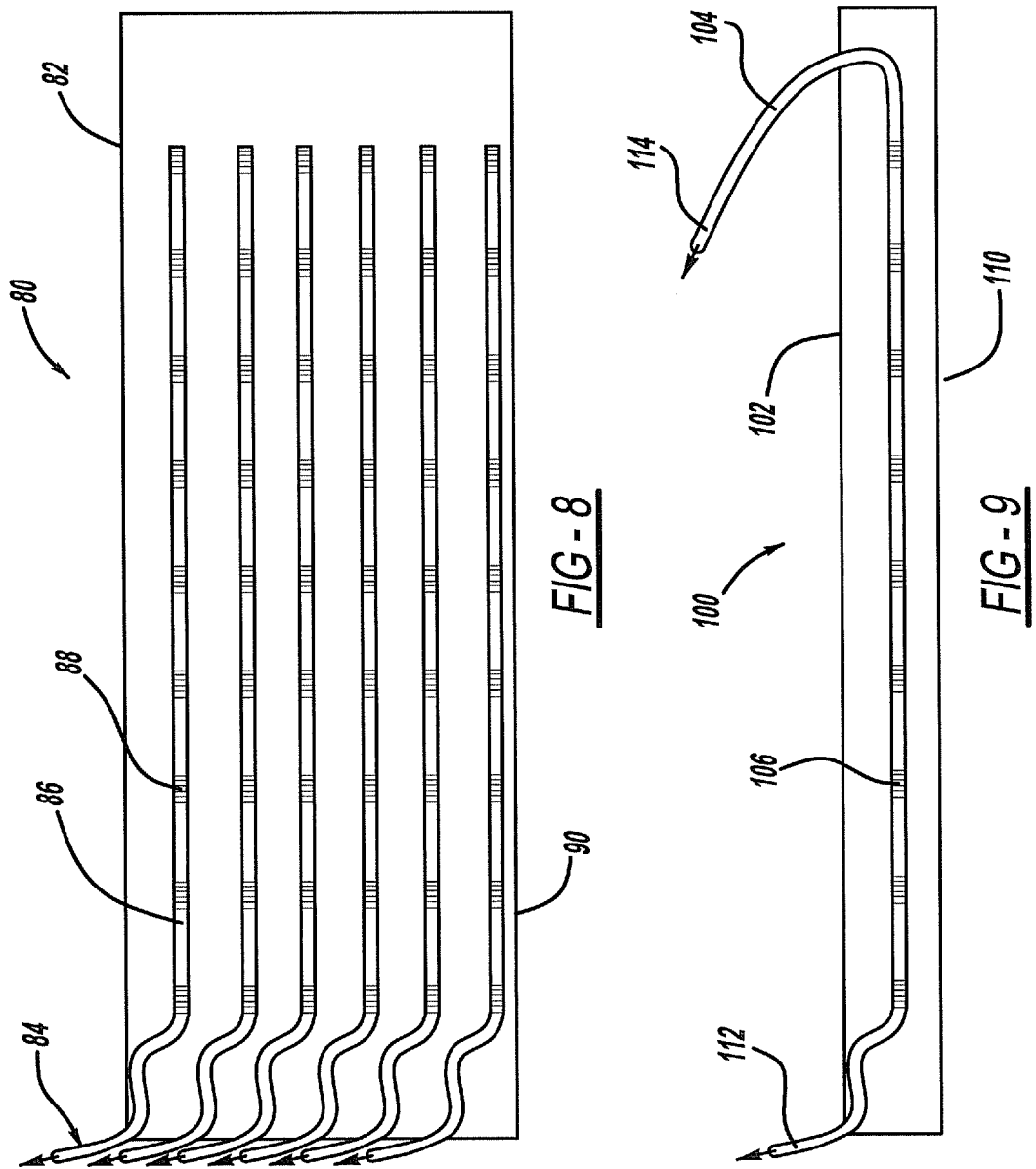

MULTIPLEXED OPTICAL FIBER WEAR SENSOR

BACKGROUND OF THE INVENTION

1. Field of the Invention

This invention relates generally to an optical fiber wear detector and, more particularly, to an optical fiber wear detector that utilizes a fiber Bragg grating (FBG) sensor or sensor array.

2. Discussion of the Related Art

Many devices, machines and associated systems employ moveable components that may interact with each other in a manner that may cause undesirable wear to the components. For example, turbines, compressors and other machines include motors that rotate shafts having blades and other elements disposed thereon. Operation of such machines may cause unwanted contact of the blades and other moving components with housings and other structures within the machine. This unwanted contact could be caused by many factors, such as thermal expansion, high shaft rotation speed, motor surge, etc. Also, some of these types of machines may employ what are known in the art as knife-edge seals that include a thin edge positioned on a rotating member that contacts a stationary structure and provides a pressure seal from one side of the edge to the other. That is, the knife edge seal limits flow and results in a differential pressure. This rotating contact point between the knife-edge and the structure must be small to limit flow, thus causing wear on both components if they inadvertently touch during machine operation, typically due to non-standard operating conditions, such as surge.

Such component wear may be excessive enough where it would affect the performance and operation of the component, system or machine that they are a part of. Various things can be done to reduce the wear, such as providing lubricants, appropriate low friction materials, favorable orientation between components, etc. However, these available remedies are not always adequate, and excessive wear may still occur. Some machines and systems allow component wear to be detected by visual inspection. However, there are many applications where such visual inspection is not possible, or is not feasible because the time, cost, labor, etc. necessary for the inspection is too great.

Many attempts have been made in the art to detect component wear by providing sensors within the component at the wear location that detect the removal of material and wear on the component. For example, it is known to embed optical fibers into the surface of a component at a location where it is desired to detect wear, and use a light beam propagating down the fiber and suitable detection circuitry to determine if the fiber has been broken as a result of the wear. Other systems that employ optical fibers are also known.

U.S. patent application Ser. No. 12/724,531, filed Mar. 16, 2010, titled Fiber Optic Sensor System for Detecting Surface Wear, assigned to the assignee of this application and herein incorporated by reference, discloses a fiber optic sensor for detecting surface wear. One or more fibers are provided within the component being detected, where one end of the fiber including a re-emission portion is positioned near the wear surface. A light beam propagating down the optical fiber contacts the re-emission portion, creating a return beam that is detectable. The re-emission portion can be a reflective element that reflects the beam or a florescent element that fluoresces in response to the beam. If the wear of the surface goes deep enough into the component where the re-emission portion is worn away or otherwise significantly damaged, then the return signal is not provided from the re-emission portion, which indicates that the wear of the component has reached a certain depth. However, this type of wear detection sensor has limitations. For example, it is typically necessary to provide the re-emission portion at the end of the fiber.

SUMMARY OF THE INVENTION

In accordance with the teachings of the present invention, an optical fiber wear detector is disclosed that includes one or more FBG sensors positioned within the fiber that are operable to reflect a defined wavelength of an optical input beam. The wear detector includes a light source for generating the optical input beam that propagates down the optical fiber and interacts with the FBG sensor. The wavelength of the optical beam that is reflected by the FBG sensor is detected, where loss of the reflected signal indicates that the fiber before the FBG sensor or the FBG sensor itself is damaged, which would most likely be an indication of wear on the component. The depth of wear can be determined by providing multiple FBG sensors in a single optical fiber and/or providing multiple optical fibers with one or more FBG sensors.

Additional features of the present invention will become apparent from the following description and appended claims, taken in conjunction with the accompanying drawings.

BRIEF DESCRIPTION OF THE DRAWINGS

FIG. 8 is a plan view of a plurality of wear detectors attached to a component including a plurality of fibers each having a plurality of FBG sensors;

FIG. 9 is a plan view of a wear detector attached to a component and including a single optical fiber having a plurality of FBG sensors.

DETAILED DESCRIPTION OF THE EMBODIMENTS

The following discussion of the embodiments of the invention directed to a wear detector including one or more FBG sensors for detecting wear on a component is merely exemplary in nature, and is in no way intended to limit the invention or its applications or uses.

As will be discussed in detail below, the present invention proposes a wear detector that employs an optical fiber including a fiber core having a periodic pattern of core sections with a different index of refraction than the rest of the fiber core so as to define a fiber Bragg grating (FBG). As is well understood by those skilled in the art, an FBG formed in the core of an optical fiber operates as a reflector or filter where an optical signal of a certain wavelength of light is reflected by the FBG and all other wavelengths are transmitted through the FBG. The wear detector uses the FBG as a sensor where the reflected wavelength is detected, and in the manner discussed above for the optical fiber wear sensor, damage to the FBG sensor can be identified when the reflection is lost. FBG sensors have heretofore been known in the art for measuring temperature or strain, but not to indicate the depth of wear on a component.

Figure 1:
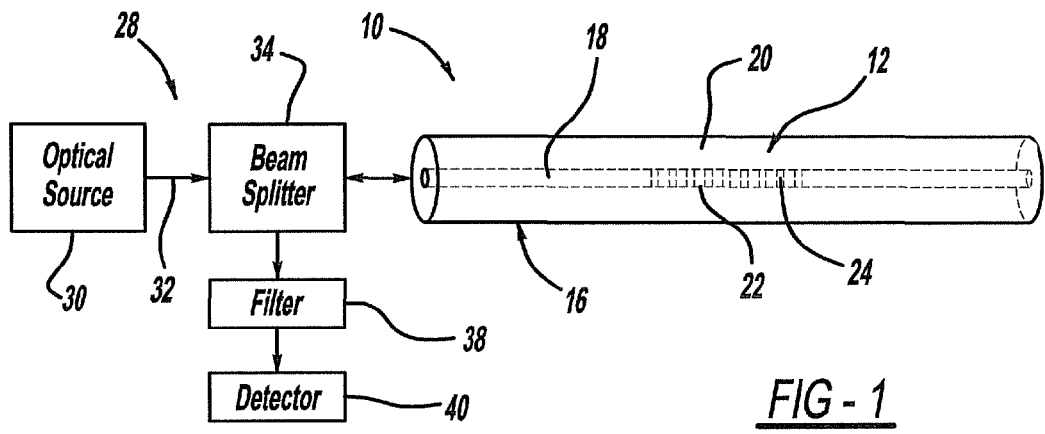
FIG. 1 is a schematic plan view of a wear detector system including an FBG sensor and detector circuitry.
Figure 2:
FIG. 2 is a graph with position on the horizontal axis and index of refraction on the vertical axis showing the index of refraction of an FBG sensor.

FIG. 1 is a schematic plan view of a wear detection system 10 including an FBG sensor 12 formed in part of an optical fiber 16. The optical fiber 16 includes an optical fiber core 18 surrounded by an outer cladding layer 20. The index of refraction of the cladding layer 20 is greater than the index of refraction of the fiber core 18 so that a light beam propagating down the fiber core 18 is reflected off of the transition between the fiber core 18 and the cladding layer 20 and is trapped therein. In one embodiment, the fiber core 18 is about 10 μm in diameter, which provides a multi-mode fiber for propagating multiple optical modes. The FBG sensor 12 is provided in the optical fiber 16 by creating an FBG 22 by a suitable optical writing process to provide a periodic pattern of sections 24 in the fiber core 18, where the sections 24 have a higher index of refraction than the rest of the fiber core 18, but a lower index of refraction than the cladding layer 20. For example, as shown partly by the graph in FIG. 2, the index of refraction $n_3$ of the sections 24 is greater than the index of refraction $n_2$ of the fiber core 18 and the index of refraction $n_3$ of the sections 24 is less than the index of refraction $n_1$ of the cladding layer 20.

Figure 3:
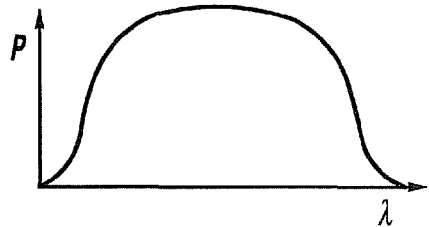
FIG. 3 is a graph with wavelength on the horizontal axis and power on the vertical axis showing the bandwidth of an input signal sent to the FBG sensor.
Figure 4:
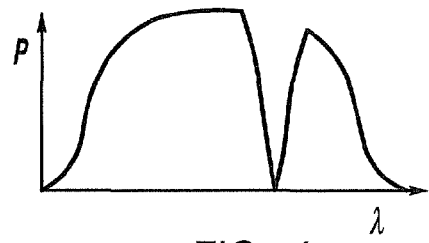
FIG. 4 is a graph with wavelength on the horizontal axis and power on the vertical axis showing the transmitted portion of the input signal through the FBG sensor.
Figure 5:
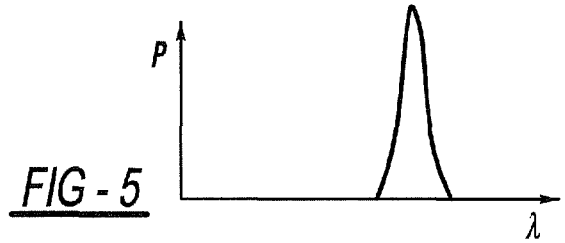
FIG. 5 is a graph with wavelength on the horizontal axis and power on the vertical axis showing the reflected portion of the input signal from the FBG sensor.

FIG. 3 is a graph with wavelength λ on the horizontal axis and power P on the vertical axis showing a wide bandwidth optical input signal that can propagate down the fiber core 18. FIG. 4 is a graph with wavelength λ on the horizontal axis and power P on the vertical axis showing the portion of the input signal that is transmitted through the FBG 22. FIG. 5 is a graph with wavelength λ on the horizontal axis and power P on the vertical axis showing the portion of the optical input signal that is reflected by the FBG 22, and having a peak at wavelength $\lambda_B$.

As is known by those skilled in the art, the FBG 22 can be selectively designed so that the index of refraction $n_2$ of the fiber core 18, the index of refraction $n_3$ of the sections 24, and the spacing Λ between the sections 24 define which wavelength $\lambda_B$ is reflected by the FBG 22 based on equation (1) below.

$$\lambda_B = 2n_3 \Lambda \quad (1)$$

The system 10 also includes a circuit 28 that generates the optical input signal and detects the reflected signal from the FBG 22. The circuit 28 includes a suitable light source 30, such as a diode, that generates a light beam 32 that is split by a beam splitter 34, where a portion of the beam 32 is directed into and propagates down the optical fiber 16 towards the FBG sensor 12. The light that is reflected by the FBG sensor 12 propagates back through the optical fiber 16 and is directed by the beam splitter 34 through a filter 38 that filters out light that is not at the reflected wavelength $\lambda_B$ to be detected by a detector 40, such as a photodiode.

In one embodiment, the circuit 28, or a similar circuit, is part of an optical sensor interrogator, such as the commercially available National Instruments NI PXIe-4844. This optical sensor interrogator provides four separate optical input channels that can be simultaneously sampled at 10 Hz with an 80 nm spectrum range of 1510-1590 nm that is the bandwidth of the optical input signal. Thus, each input channel in the interrogator can be coupled to a separate optical fiber including one or more FBG sensors, as discussed below. Optical switching or multiple interrogators can be used to increase the number of fibers being monitored. Because most FBG sensors occupy only a 1-5 nm range, numerous FBG sensors can be connected to each optical channel in the interrogator. For example, for an optical input beam spectrum of 1510-1590 nm, each separate channel in the interrogator can include up to fifteen FBG sensors.

Figure 6:
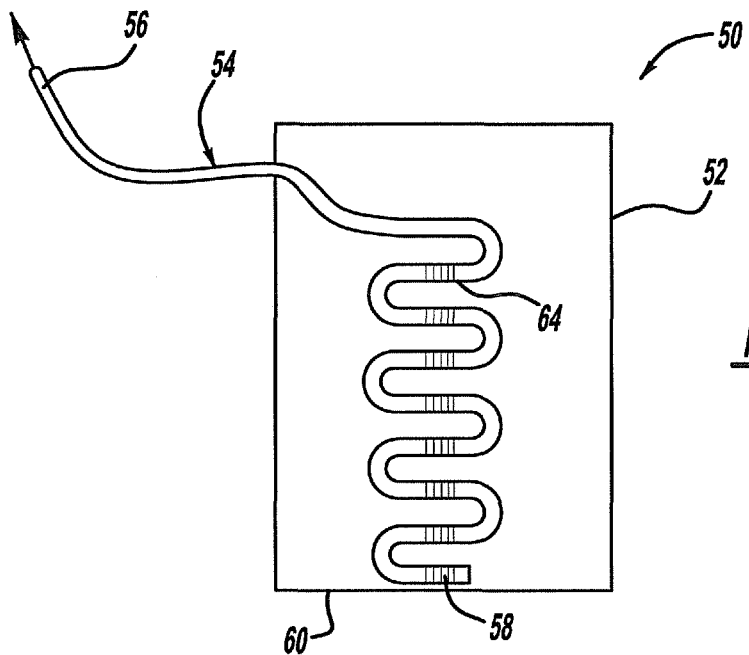
FIG. 6 is a plan view of a wear detector attached to a component and including a plurality of FBG sensors in a single fiber.

FIG. 6 is a plan view of a wear detector system 50 mounted to a component 52 that is being monitored for wear, such as cracks or other defects. The component 52 is intended to be representative of any component of any shape that the optical fiber sensors discussed herein can be mounted to. In one example discussed below, the component can be part of a gas turbine engine. The wear detector system 50 includes a single optical fiber 54 of the type discussed above having an input end 56 that will be coupled to the appropriate circuitry, discussed above. Particularly, the end 56 of the optical fiber 54 is optically coupled to the interrogator, or other detection circuitry, from which the wide bandwidth input signal is transmitted and from which the reflected wavelength $\lambda_B$ is received.

The optical fiber 54 can be mounted to a surface of the component 52 by any technique suitable for the purposes discussed herein, such as by a suitable high temperature epoxy or ceramic cement. Alternately, the optical fiber 54 can be embedded within the component 52 by epoxying the fiber 54 into holes drilled in the component 52 or by epoxying the fiber 54 into small trenches machined in the component 52.

In this embodiment, the optical fiber 54 includes eight FBG sensors 58 spaced apart at a detection end of the optical fiber 54 opposite to the end 56 that is mounted to the component 52. The optical fiber 54 is mounted to the component 52 in such a manner that it meanders back and forth so that the FBG sensors 58 are in line with each other and spaced apart a desired distance, as shown. The FBG sensors 58 are designed so that each one reflects a different wavelength $\lambda_B$ or color consistent with equation (1). Those skilled in the art would readily recognize how to design the FBG sensors 58, whether it is one or both of the spacing Λ of the sections 24 and the index of refraction $n_3$ of the sections 24, to achieve the desired reflected wavelength $\lambda_B$.

The component 52 being monitored has a wear surface 60 that is the direction from which the interaction with another component (not shown) would cause wear on the component 52. As the wear on the wear surface 60 occurs, each FBG sensor 58 in the line of sensors is systematically damaged so that it will not operate and reflect the wavelength $\lambda_B$ of light that it would when it is intact. Therefore, as the wear occurs, and continues to occur, the first one of the FBG sensors 58 closest to the wear surface 60 is damaged so that the analysis system will know how deep the wear has occurred based on losing that reflected signal. Each time an FBG sensor 58 is damaged, and its reflected signal is lost, the system 50 knows how deep the wear has occurred in the component 52 until it reaches the last FBG sensor 64 in the line.

Figure 7:
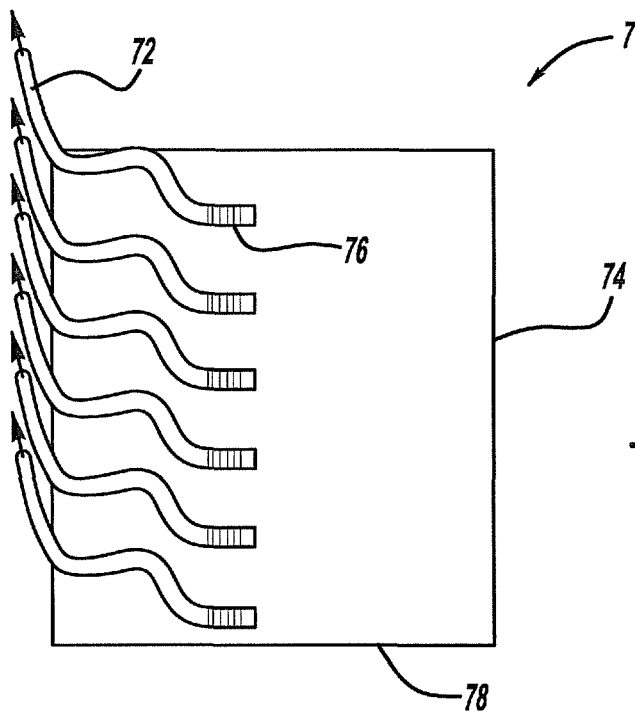
FIG. 7 is a plan view of a plurality of wear detectors attached to a component including a plurality of fibers each having a single FBG sensor.

FIG. 7 is a plan view of a wear detector system 70 including a plurality of optical fibers 72 mounted to a component 74 being monitored for wear. Each optical fiber 72 includes a single FBG sensor 76 at the end of the optical fiber 72 that is mounted to the component 74 so that all of the FBG sensors 76 are in line with each other in the same manner as the FBG sensors 58. In this embodiment, because there is a separate optical channel for each separate FBG sensor 76, the FBG sensors 76 can all reflect the same wavelength $\lambda_B$ if so desired by the user. Thus, as above, as the component 74 wears at a wear surface 78, the first FBG sensor 76 in the first optical fiber 72 is damaged and the wear detector system 70 will know the depth of the wear based on that loss of the reflected signal.

FIG. 8 is a plan view of a wear detector system 80 for detecting wear on a component 82 and including a plurality of optical fiber channels 84 each including an optical fiber 86, where each optical fiber 86 includes a plurality of spaced apart FBG sensors 88 in the optical fiber 86. In this embodiment, each optical fiber 86 includes nine FBG sensors 88, which would reflect a different wavelength $\lambda_B$ in each channel, but the corresponding FBG sensor 88 in another fiber 86 could reflect the same wavelength $\lambda_B$. Thus, a single optical fiber can detect multiple wear locations making it a multiplexed sensor. The number of FBG sensors 88 in the optical fiber 86 is limited by the bandwidth of the input optical beam. As mentioned above, for an input optical beam having a bandwidth of 1510-1590 nm, the number of FBG sensors may be limited to about fifteen.

This specialized wear detector system may be applicable for situations where there is some type of uneven wear along a wear surface 90 where different regions along the wear surface 90 are monitored for wear. For example, if there are a plurality of knife-edge seals extending along the wear surface 90 that only periodically contact the wear surface, then the wear can be separately detected at those contact locations. Thus, each line of FBG sensors 88 would identify a particular location on the component 82 so that wear at that location can be separately identified from other locations in the component 82 corresponding to other FBG sensors 88. This embodiment will have application for circular or rounded components, as well as straight components.

FIG. 9 is a plan view of a wear detector system 100 that detects wear on a component 102 and includes a single optical fiber 104 having a plurality of FBG sensors 106 mounted to the component 102. In this design, opposite ends of the optical fiber 104 are coupled to separate channels in the analysis circuitry. In other words, separate input light beams can be sent down opposite ends of the optical fiber 104. By alternating the optical input signals sent down the optical fiber 104 in the two directions, a certain defect, such as a crack, can be monitored from both directions. For example, if there is a crack at wear location 110, the signal from the channel coupled to one end 112 of the optical fiber 104 can still read the FBG sensors 106 to the left of the defect and the signal from the channel coupled to the other end 114 of the optical fiber 104 can read the FBG sensors 106 at the right of the defect.

Figure 10:
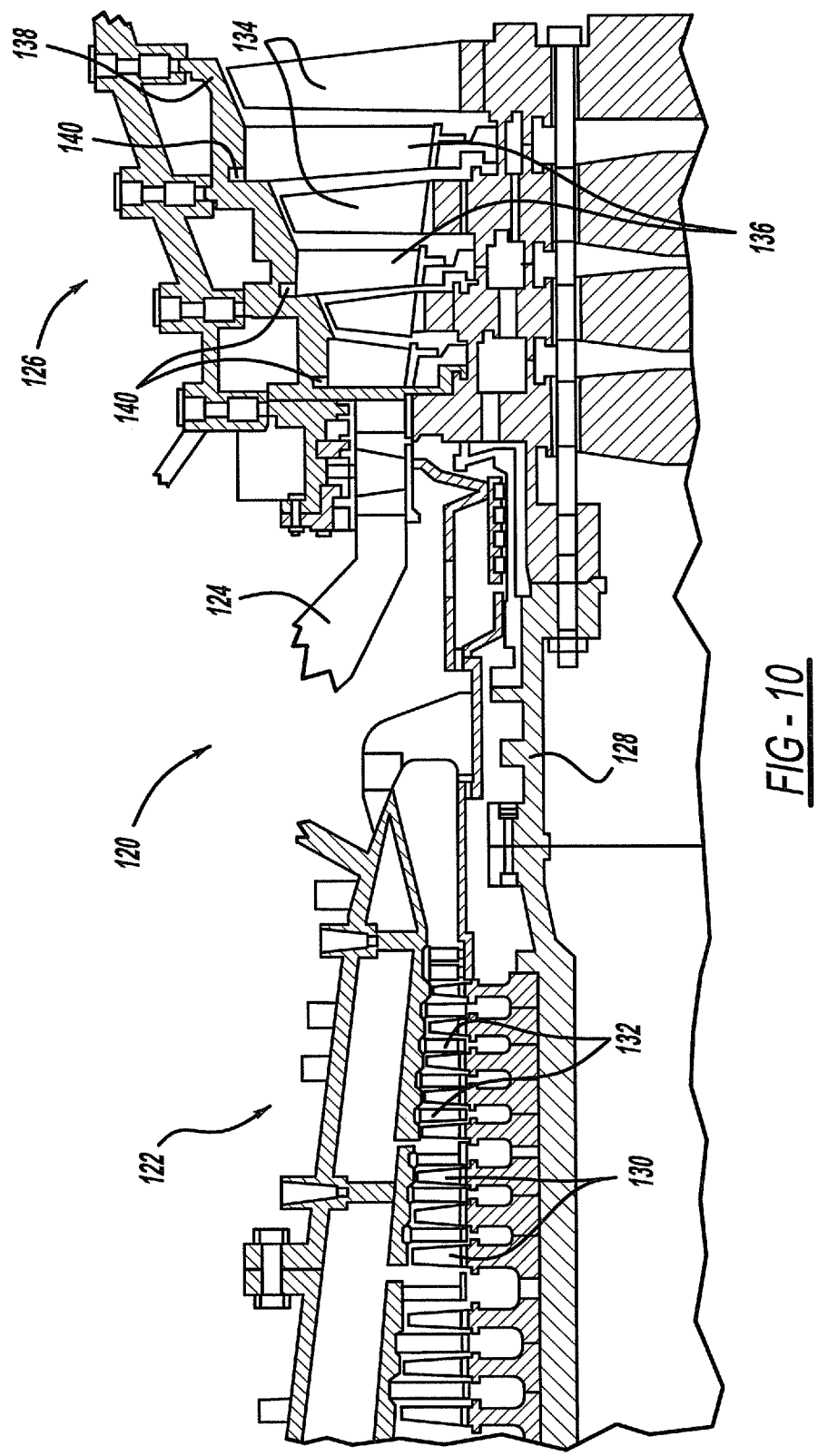
FIG. 10 is a cut-away, cross-sectional view of a gas turbine engine including one or more wear detectors including an FBG sensor.

FIG. 10 is a cut-away, cross-sectional view of a portion of a gas turbine engine 120 including a compressor section 122, a combustion section 124 and a turbine section 126, where operation of the engine 120 rotates a shaft 128. As is well understood by those skilled in the art, gas turbine engines of this type have various applications, such as electric generators in a power generating plant, aircraft engines, ship engines, etc. The compressor section 122 includes a plurality of rotatable blades 130 positioned between respective stationary vanes 132. Likewise, the turbine section 126 includes a plurality of rotatable blades 134 and stationary vanes 136 positioned therebetween. The vanes 136 are mounted to an appropriate structure within the turbine section 126 by a suitable support component 138, for example, a blade ring, as would be well understood by those skilled in the art. The blades 134 and the vanes 136 are designed for high temperature applications, and typically are made from a suitable super-alloy material, for example, a nickel, cobalt or iron based super-alloy material, which may be coated with a thermal barrier coating (TBC), for example, yttria-stabilized zirconia. The combustion section 124 includes a plurality of combustors circumferentially positioned around the turbine engine 120.

Air is drawn into the compressor section 122 where it is compressed and driven towards the combustion section 124. The combustion section 124 mixes the air with a fuel where it is ignited to generate a working gas typically having a temperature above 1300° C. The working gas expands through the turbine section 126 and is guided across the blades 134 by the vanes 136. As the working gas passes through the turbine section 126, it causes the blades 134 to rotate, which in turn causes the shaft 128 to rotate, thereby providing mechanical work. A more detailed discussion of a gas turbine engine of this type can be found in U.S. Pat. No. 7,582,359, titled Apparatus and Method of Monitoring Operating Parameters of a Gas Turbine, assigned to the assignee of this application and herein incorporate by reference.

Because of the harsh environment within the gas turbine engine 120, many of the components in the engine 120, such as the blades 130, 134 and the vanes 132, 136, may be subjected to undesirable wear. For example, during certain operating conditions, such as mechanical vibration, thermal expansion and cycling, etc., the vanes 136 and the support component 138 may have a relative movement therebetween that may cause undesirable wear on the vanes 136. Also, the turbine blades 134 may form a knife-edge seal with an abrading material at an outer edge of the blade 134, where it may be desirable to detect excessive wear in the abrading material, as is known by those skilled in the art. As discussed above, it may be desirable to monitor these components to detect this wear, and provide suitable maintenance if required. For at least some of these components, one or more of the various wear detectors employing FBG sensors discussed above can be used to detect the wear. For example, it may be desirable to provide an appropriate FBG sensor 140 positioned at the proper location in the support component 138 to detect wear. Other components within the engine 120 may also be applicable for a wear detector employing an FBG sensor.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A wear sensor assembly for monitoring wear and other defects in a component, said sensor assembly comprising:
    at least one light source generating an optical beam;
    at least one optical fiber receiving the optical beam from the at least one light source, said optical fiber including a fiber core through which the optical beam propagates and a at least one fiber Bragg grating formed in the core, said fiber Bragg grating being operable to reflect a predefined wavelength of the optical beam back along the optical fiber and allow other wavelengths in the optical beam to propagate through the fiber Bragg grating;
    a detector for detecting the reflected wavelength of the optical beam from the fiber Bragg grating, wherein the wear on the component is detected when no reflected wavelength of the optical beam from the fiber Bragg grating is received by the detector, and wherein the at least one optical fiber is mounted to the component in a meandering orientation and the at least one fiber Bragg grating is a plurality of fiber Bragg gratings positioned within the optical fiber and spaced apart so that the fiber Bragg gratings are in line with each other; and wherein each fiber Bragg grating reflects a different optical wavelength so that detection or no detection of the reflected wavelength of the optical beam indicates a depth of the wear in the component.

2. The sensor assembly according to claim 1 wherein the at least one optical fiber is a plurality of optical fibers mounted to the component where each optical fiber includes a fiber Bragg grating.

3. The sensor assembly according to claim 2 wherein each fiber Bragg grating in each optical fiber reflects the same wavelength of the optical beam.

4. The sensor assembly according to claim 3 wherein the plurality of optical fibers are mounted to the component so that the fiber Bragg gratings in the plurality of optical fibers are oriented in line with each other so that detection or no detection of the reflected wavelength of the optical beam indicates a depth of the wear in the component.

5. The sensor assembly according to claim 1 wherein the at least one optical fiber is a plurality of optical fibers where each optical fiber includes a plurality of spaced apart fiber Bragg gratings.

6. The sensor assembly according to claim 5 wherein each fiber Bragg grating in each optical fiber reflects a different wavelength of the optical beam, and wherein the fiber Bragg gratings in different optical fibers are in line with each other.

7. The sensor assembly according to claim 1 wherein the at least one optical fiber is a single optical fiber including a plurality of spaced apart fiber Bragg gratings where each fiber Bragg grating reflects a different wavelength of the optical beam, and wherein opposite ends of the optical fiber are coupled to different channels that provide different input optical beams.

8. The sensor assembly according to claim 1 wherein the component is part of a turbine engine.

9. A wear sensor for monitoring wear and other defects in a component, said sensor comprising at least one optical fiber receiving an optical beam, said optical fiber including a fiber core through which the optical beam propagates and a plurality of fiber Bragg gratings formed in the core and being spaced apart from each other, each fiber Bragg grating being operable to reflect a predefined wavelength of the optical beam back along the optical fiber and allow other wavelengths in the optical beam to propagate through the fiber Bragg grating, where loss of the reflected wavelength indicates wear on the component, wherein the at least one optical fiber is mounted to the component in a meandering orientation and the plurality of fiber Bragg gratings are positioned within the optical fiber and spaced apart so that the fiber Bragg gratings are in line with each other, and wherein each fiber Bragg grating reflects a different optical wavelength to indicate a depth of the wear in the component.

10. The sensor according to claim 9 wherein the at least one optical fiber is a plurality of optical fibers where each optical fiber includes a plurality of spaced apart fiber Bragg gratings.

11. The sensor according to claim 9 wherein the at least one optical fiber is a single optical fiber, and wherein opposite ends of the optical fiber are coupled to different channels that provide different input optical beams.

12. A gas turbine engine comprising:
a shaft rotatably provided along a center line of the engine;
a compressor section responsive to a working fluid and being operable to compress the working fluid to produce a compressed working fluid;
a combustion section in fluid communication with the compressor section that receives the compressed working fluid, said combustion section mixing the compressed working fluid with a fuel and combusting the compressed fluid and fuel mixture to produce a hot working fluid;
a turbine section in fluid communication with the combustion section, said turbine section expanding the hot working fluid to produce mechanical power through rotation of the shaft; and
at least one wear sensor operatively coupled to a component in the engine, said at least one wear sensor including at least one optical fiber receiving an optical beam, said at least one optical fiber including a fiber core through which the optical beam propagates and at least one fiber Bragg grating formed in the core, said at least one fiber Bragg grating being operable to reflect a predefined wavelength of the optical beam back along the optical fiber and allow other wavelengths in the optical beam to propagate through the fiber Bragg grating, wherein wear on the component is detected when no reflected wavelength of the optical beam from the fiber Bragg grating is received by the detector, and wherein the at least one optical fiber is mounted to the component in a meandering orientation and the at least one fiber Bragg grating is a plurality of fiber Bragg gratings positioned within the optical fiber and spaced apart so that the fiber Bragg gratings are in line with each other, and wherein each fiber Bragg grating reflects a different optical wavelength so that detection or no detection of the reflected wavelength of the optical beam indicates a depth of the wear in the component.

13. The engine according to claim 12 wherein the component is a vane mounting component in the turbine section.

14. The engine according to claim 12 wherein the at least one optical fiber is a plurality of optical fibers mounted to the component where each optical fiber includes a fiber Bragg grating.

15. A wear sensor assembly for monitoring wear and other defects in a component, said sensor assembly comprising:
at least one light source generating an optical beam;
at least one optical fiber receiving the optical beam from the at least one light source, said optical fiber including a fiber core through which the optical beam propagates and at least one fiber Bragg grating formed in the core, said fiber Bragg grating being operable to reflect a predefined wavelength of the optical beam back along the optical fiber and allow other wavelengths in the optical beam to propagate through the fiber Bragg grating; and
a detector for detecting the reflected wavelength of the optical beam from the fiber Bragg grating, wherein the wear on the component is detected when no reflected wavelength of the optical beam from the fiber Bragg grating is received by the detector, and wherein the at least one optical fiber is a plurality of optical fibers mounted to the component where each optical fiber includes a fiber Bragg grating, and wherein each fiber Bragg grating in each optical fiber reflects the same wavelength of the optical beam.

16. The sensor assembly according to claim 15 wherein the plurality of optical fibers are mounted to the component so that the fiber Bragg gratings in the plurality of optical fibers are oriented in line with each other so that detection or no detection of the reflected wavelength of the optical beam indicates a depth of the wear in the component.

17. A wear sensor assembly for monitoring wear and other defects in a component, said sensor assembly comprising:
at least one light source generating an optical beam;
at least one optical fiber receiving the optical beam from the at least one light source, said optical fiber including a fiber core through which the optical beam propagates and at least one fiber Bragg grating formed in the core, said fiber Bragg grating being operable to reflect a predefined wavelength of the optical beam back along the optical fiber and allow other wavelengths in the optical beam to propagate through the fiber Bragg grating; and
a detector for detecting the reflected wavelength of the optical beam from the fiber Bragg grating, wherein the wear on the component is detected when no reflected wavelength of the optical beam from the fiber Bragg grating is received by the detector, and wherein the at least one optical fiber is a plurality of optical fibers where each optical fiber includes a plurality of spaced apart fiber Bragg gratings, and wherein each fiber Bragg grating in each optical fiber reflects a different wavelength of the optical beam, and wherein the fiber Bragg gratings in different optical fibers are in line with each other.

18. A wear sensor assembly for monitoring wear and other defects in a component, said sensor assembly comprising:
at least one light source generating an optical beam;
at least one optical fiber receiving the optical beam from the at least one light source, said optical fiber including a fiber core through which the optical beam propagates and at least one fiber Bragg grating formed in the core, said fiber Bragg grating being operable to reflect a predefined wavelength of the optical beam back along the optical fiber and allow other wavelengths in the optical beam to propagate through the fiber Bragg grating; and
a detector for detecting the reflected wavelength of the optical beam from the fiber Bragg grating, wherein the wear on the component is detected when no reflected wavelength of the optical beam from the fiber Bragg grating is received by the detector, and wherein the at least one optical fiber is a single optical fiber including a plurality of spaced apart fiber Bragg gratings where each fiber Bragg grating reflects a different wavelength of the optical beam, and wherein opposite ends of the optical fiber are coupled to different channels that provide different input optical beams.

19. A wear sensor for monitoring wear and other defects in a component, said sensor comprising at least one optical fiber receiving an optical beam, said optical fiber including a fiber core through which the optical beam propagates and a plurality of fiber Bragg gratings formed in the core and being spaced apart from each other, each fiber Bragg grating being operable to reflect a predefined wavelength of the optical beam back along the optical fiber and allow other wavelengths in the optical beam to propagate through the fiber Bragg grating, where loss of the reflected wavelength indicates wear on the component, wherein the at least one optical fiber is a single optical fiber, and wherein opposite ends of the optical fiber are coupled to different channels that provide different input optical beams.

* * * * *